United States Patent Office 3,053,680
Patented Sept. 11, 1962

3,053,680
THERMOPLASTIC MOLDING COMPOSITIONS
Harry W. Parker and John W. Marx, Bartlesville, Okla., assignors to Phillips Petroleum Company, a corporation of Delaware
No Drawing. Filed Apr. 1, 1960, Ser. No. 19,155
8 Claims. (Cl. 106—241)

This invention relates to the preparation of molding compositions. In one aspect this invention relates to the preparation of a thermoplastic molding composition comprising a mixture of oil shale and sulfur.

For years it has been desired to manufacture articles having a hard surface from plastic materials. In the prior art molded articles have been prepared from various naturally-occurring materials after suitable preparation. Clays have furnished about the only natural source of supply of a base material which can be mined in large quantities and pressed into shaped articles. A binder is included to bind the material during the pressing or molding operation. A disadvantage of such molded articles results from the fact that having once been molded they cannot be remolded and therefore the manufacture of molded articles from such materials is accompanied by an inevitable amount of waste material resulting from breakage and imperfect molding operations.

It is therefore a principal object of this invention to provide a molding composition which is thermoplastic in nature and is derived from naturally-occurring materials. It is also an object of this invention to improve the hardness and machinability characteristics of articles molded from oil shale. A further object of this invention is to provide articles molded from oil shale which have improved surface characteristics of hardness, smoothness, and general appearance. Other objects, advantages and features of this invention will become apparent to one skilled in the art upon a study of this disclosure, including a detailed description of the invention.

In our copending application Serial No. 862,034, filed December 28, 1959, we have disclosed a method for preparing molded articles from oil shale having a softer surface than is obtained with oil shale alone by incorporating into the oil shale about 30 to about 95 weight percent of a solid polyolefin. In our copending application Serial No. 862,035, filed December 28, 1959, now abandoned, we have disclosed the production of articles molded from oil shale and an aldehyde to provide specific hardness characteristics to the molded articles.

We have now found that a minor amount of finely divided sulfur can be added to finely divided oil shale to provide a molding composition which is thermoplastic and which produces a molded article having improved characteristics of hardness and machinability. We have found that oil shales containing as little as 15 gallons of recoverable, nonbenzenoid-type oil per ton of mineral can be utilized in making the molding compositions of the invention. Articles produced from the molding compositions of this invention display properties of lasting beauty, good mechanical strength, and high electrical resistivity, as well as controlled characteristics of hardness and machinability.

Oil shales having recoverable, nonbenzenoid-type oil content of from about 15 to 85 or more gallons per ton of mineral are crushed or ground to an average particle size such as to pass through a 50 to 200 mesh screen and the ground oil shale is then intimately admixed with finely divided sulfur, such as flour of sulfur, after which the mixture is subjected to heat and pressure to produce the desired shaped article. The mixture is placed in a mold, the mold is closed and heated to a temperature in the range of about 250 to about 400° F. while applying a pressure of about 500 to about 20,000 p.s.i., or higher, for about one-half minute to 10 minutes. The mold is then cooled to a temperature generally below 250 and preferably below 212° F. before the pressure is released. The molding temperature is, in every case, below the decomposition temperature of the kerogen present in the oil shale. The molding time will be that necessary to plasticize the kerogen and the sulfur, and presumably to provide contact between the kerogen and the sulfur present in the mixture.

The kerogen and the sulfur, at the molding conditions of temperature and pressure, appear to be extremely compatible as evidenced by the increased hardness characteristics and the response of the molded article to wax and to polishing when even extremely small amounts of sulfur are mixed with the oil shale.

The sulfur is intimately admixed with the oil shale in an amount of about 1 to about 20 weight percent, or more, of the mixture. While greater amounts of sulfur can be utilized in the molding composition, the properties of the molding composition begin to take on properties of the sulfur, with concomitant loss of the properties of the oil shale, so that in practically all instances it will be desirable to maintain the sulfur content at about 20 weight percent of the mixture or less.

Oil shales containing kerogen equivalent to about 25 to about 35 gallons of nonbenzenoid-type oil per ton of mineral are particularly desirable from the standpoint of excellence of molded article and availability of oil shale.

While entirely satisfactory results are obtained by dry-blending finely divided oil shale and the finely divided sulfur, it is preferable to utilize procedures similar to those employed in the rubber industry, for example, milling or Banbury mixing, to reduce the materials to a substantially homogeneous mixture. Extruders or extrusion rolls can then be utilized to form articles of manufacture from the blended mixture. Articles such as floor tile, siding, roofing, and other building materials are examples of products which can be manufactured readily from these materials.

Color pigments and cover agents can be incorporated into the materials during the blending operations to form a wide spectrum of color ranging from light tan or buff through yellow, blue, green, maroon and black.

The abrasion resistance and hardness of these materials are superior to the materials most commonly utilized in the fabrication of articles such as floor tile, including resin-, rubber-, polyethylene-, or asphalt-compositions. The mechanical strength of the molded articles of this composition is as good as, or superior to, similar conventional molded articles. The appearance (shape, color and porosity) of the molded articles is unaffected by contact with boiling water for as long as 16 hours.

The articles molded from the compositions of this invention retain their thermoplastic characteristics and can be crushed or ground and reused so long as the molding temperature or the temperature to which the finished article is subjected is below the decomposition temperature of the kerogen.

The following specific examples present data which illustrate and clarify the invention but should not be so interpreted as to restrict or to limit the invention unnecessarily.

*Example 1*

A sample of Colorado oil shale having a nonbenzenoid kerogen content equivalent to 30 gallons of recoverable shale oil per ton of mineral was comminuted to pass a 100-mesh screen. To a portion of this comminuted shale was added and intimately admixed therewith 2 weight percent, based on the total mixture, of flour of sulfur. The intimately mixed molding composition was pressed in a 1¼-inch cylindrical mold and was heated to a temperature of 316° F. between the platens of an electrically heated hydraulic press. When the specified temperature was reached, the mold was closed by the application of 5000 p.s.i. pressure and the temperature and pressure were maintained for two minutes. The mold was then removed from the press, cooled below 250° F., and the molded article, in the form of a 1¼-inch disc about one-fourth inch thick, was removed from the mold.

A second disc was molded from a portion of the oil shale to which no sulfur had been added and the same conditions of time, temperature and pressure were employed.

The disc containing the sulfur had an initial Shore "D" hardness of 84 and a final Shore "D" hardness of 83 as compared to an initial Shore "D" hardness of 84 and a final Shore "D" hardness of 80 for the disc to which no sulfur had been added. The disc molded from the composition containing sulfur was placed in boiling water for 8 hours without causing distortion, change of color, or other changes in physical appearance.

*Example II*

A molding powder was prepared as in Example I, utilizing another portion of the same sample of oil shale; but in this case 20 weight percent, based on the mixture, of flour of sulfur was utilized instead of 2 percent as in Example I. The molded disc was similar in appearance to the disc containing 2 percent sulfur after being molded under the same conditions of time, temperature and pressure as in Example I but had a smoother, more polished appearance than the one with 2% sulfur.

The initial Shore "D" hardness of this disc was 86 and the final Shore "D" hardness was 85. This material also displayed good properties of machinability and responded well to polishing materials and wax finishes. The disc was placed in boiling water for 8 hours without noticeable change in appearance. No distortion or change in mechanical structure or porosity of the material was observed as a result of the hot water treatment as evidenced by substantially the same properties of machinability, and response to polishing was observed before and after the hot water treatment.

The initial Shore "D" hardness of a sample containing 10 weight percent sulfur was 86 and the final Shore "D" hardness was 84.

The Shore "D" hardness was measured with a Durameter with a D-type Indentor Point. The initial hardness value is believed to represent the surface hardness and the final hardness to represent the hardness of the interior. It can be considered that the final hardness value represents the ability of the material to resist deformation by compressional loads.

Reasonable variations and modifications are possible within the scope of this disclosure without departing from the spirit and scope of the invention.

That which is claimed is:

1. The process of making molded articles which comprises intimately admixing a measurable amount of finely divided sulfur sufficient to improve the characteristics of hardness and machinability of the molded article and finely divided oil shale, containing at least about 15 gallons of available oil per ton of oil shale, and subjecting the mixture to a temperature in the range of about 250 to about 400° F. and to a molding pressure of at least 500 p.s.i. for a time sufficient to plasticize the kerogen of the oil shale and the sulfur.

2. The process of claim 1 wherein the amount of sulfur is in the range of about 1 to about 20 weight percent based on the mixture.

3. The process of claim 1 wherein the oil shale and sulfur are dry blended prior to molding.

4. The process of claim 1 wherein the oil shale and sulfur are milled prior to molding.

5. The process of claim 1 wherein the oil shale and sulfur are milled and then passed through an extruder prior to molding.

6. The process of making molded articles which comprises intimately admixing finely divided sulfur and finely divided oil shale containing about 25 to about 35 gallons of available nonbenzenoid oil per ton of shale, wherein the sulfur is present in the range of about 1 to about 20 weight percent based on the mixture; and subjecting the mixture to a temperature in the range of about 250 to about 400° F. and a pressure in the range of about 500 to about 20,000 p.s.i. for about ½ minute to about 10 minutes.

7. A molding composition comprising a mixture of finely divided oil shale, containing at least about 15 gallons of available oil per ton of oil shale, and finely divided sulfur wherein the sulfur is present in the amount of about 1 to about 20 percent based on the weight of the total of oil shale and sulfur.

8. A molded article comprising a substantially homogeneous mixture of oil shale, containing at least about 15 gallons of available oil per ton of oil shale, and a sufficient amount of sulfur to improve the characteristics of hardness and machinability of the molded article which has been molded at a temperature in the range of about 250 to about 400° F. and a pressure of at least about 500 p.s.i.

References Cited in the file of this patent

UNITED STATES PATENTS

| | | |
|---|---|---|
| 2,706,160 | Glab | Apr. 20, 1955 |
| 2,900,269 | Bauman et al. | Aug. 18, 1959 |

OTHER REFERENCES

Bureau of Mines Bulletin 415, pages 105–118, particularly lines 10–14, page 108.